US008414382B2

(12) United States Patent
Denham et al.

(10) Patent No.: US 8,414,382 B2
(45) Date of Patent: Apr. 9, 2013

(54) METHODS AND APPARATUS FOR CASHLESS GAMING CREDIT TRANSFER

(75) Inventors: Rob Denham, Reading (GB); Eric Meyerhofer, Pasadena, CA (US); John Hilbert, Torrance, CA (US)

(73) Assignee: FutureLogic, Inc., Glendale, CA (US)

( * ) Notice: Subject to any disclaimer, the term of this patent is extended or adjusted under 35 U.S.C. 154(b) by 0 days.

(21) Appl. No.: 12/600,827

(22) PCT Filed: May 19, 2008

(86) PCT No.: PCT/US2008/064170

§ 371 (c)(1), (2), (4) Date: May 10, 2010

(87) PCT Pub. No.: WO2008/144674

PCT Pub. Date: Nov. 27, 2008

(65) Prior Publication Data

US 2010/0291994 A1 Nov. 18, 2010

Related U.S. Application Data

(60) Provisional application No. 60/938,960, filed on May 18, 2007.

(51) Int. Cl.
*G06F 17/00* (2006.01)

(52) U.S. Cl. .......................................................... 463/25

(58) Field of Classification Search ............... 463/16–25
See application file for complete search history.

(56) References Cited

U.S. PATENT DOCUMENTS

| | | | | |
|---|---|---|---|---|
| 7,419,428 | B2 * | 9/2008 | Rowe | 463/25 |
| 2009/0239656 | A1 * | 9/2009 | Meyerhofer et al. | 463/25 |
| 2010/0167811 | A1 * | 7/2010 | Denham et al. | 463/25 |
| 2010/0222132 | A1 * | 9/2010 | Sanford et al. | 463/25 |

* cited by examiner

*Primary Examiner* — Ronald Laneau
(74) *Attorney, Agent, or Firm* — Frank L. Cire

(57) ABSTRACT

A gaming table device which allows casinos and other types of gambling establishments to link gaming tables and point of sale terminals in or associated with a casino to connect and use systems. The systems may include a TITO (Ticket In Ticket Out) host system for credit transfer from cash, RFID chips, non-RFID chips, gaming vouchers, and promotional coupons to gaming vouchers, promotional coupons, chips and rewritable cards, among others, thereby expanding the use of credit transfer within a gaming establishment and or associated gaming establishments and their slot machines, change machines, and cashier cages to include gaming tables.

15 Claims, 8 Drawing Sheets

METHODS AND APPARATUS FOR CASHLESS GAMING CREDIT TRANSFER

CROSS-REFERENCE TO RELATED APPLICATION

The present application claims the benefit of U.S. Provisional Application No. 60/938,960 filed May 18, 2007 the contents of each of which is incorporated by reference as if stated in full herein.

BACKGROUND OF THE INVENTION

1. Field of the Invention

This invention relates generally to gaming and casinos, and more specifically to a cashless enabled gaming table device using ticket-in and ticket-out and RFID technology.

2. Background

The gaming machine manufacturing industry provides a variety of gaming machines and gaming tables for the amusement of patrons at a gaming establishment. An exemplary gaming machine is a slot machine, an electro-mechanical game wherein chance or the skill of a player determines the outcome of the game. An exemplary gaming table is a poker table. Slot machines and gaming tables usually are found in casinos or other more informal gaming establishments.

Cashless enabled gaming, now part of the gaming market, has found wide acceptance in the gaming industry. Cashless enabled games used in cashless enabled gaming are so named because they can conduct financial exchanges using a mixture of traditional currencies and vouchers. Typically, a cashless enabled game has a gaming printer to produce vouchers and a voucher reader that supports automatic reading of vouchers. To coordinate the activities of multiple cashless enabled games, one or more cashless enabled games may be electronically connected to a cashless enabled game system that controls the cashless operations of a cashless enabled game.

When a player cashes out using a cashless enabled game such as a slot machine operably connected to a cashless enabled game system, the cashless enabled game signals the system and the system may determine the type of pay out presented to the player. Depending on the size of the pay out, the cashless enabled game system may cause the cashless enabled game to present coins in the traditional method of a slot machine, or the cashless enabled game system may cause a gaming printer in the cashless enabled game to produce a voucher for the value of the pay out. The voucher may then be redeemed in a variety of ways. For example, the voucher may be redeemed for cash at a cashier's cage or used with another cashless enabled game. In order to use the voucher in a cashless enabled game, the voucher is inserted into a voucher reader of another cashless enabled game at a participating casino and the cashless enabled game system recognizes the voucher, redeems the voucher, and places an appropriate amount of playing credits on the cashless enabled game.

Cashless enabled games have found an increasing acceptance and use in the gaming industry, both with players who enjoy the speed of play and ease of transporting their winnings around the casino and casinos who have realized significant labor savings in the form of reduced coin hopper reloads in the games, and an increase in revenue because of the speed of play.

More recently, casino chips containing RFID technology have been introduced. These chips provide for an automated mechanism by which to track patron winnings and dealer tips, among others.

Definitions

For the purposes of this document the following definitions apply:

"Gaming Establishment"—A casino in the traditional sense, or other place where gambling takes place.

"Game", "Gaming Machine", or "Game Machine"—A game table or gaming machine such as any electro-mechanical game of chance A Slot Machine is a sub-set of such games.

"Printer"—A printing device operably connected to a Game, a vending machine or kiosk, or a point-of-sale (POS) system.

"Gaming Voucher"—Media containing sufficient information to identify at a minimum, an amount of money and a validation number use to authenticate the transaction. A gaming voucher may consist of thermal paper, thermal rewritable media or smart cards such as commonly used debit and/or credit cards for financial transactions. Information storage on the media may include magnetic encoding.

"Promotional Coupon"—Media containing sufficient information to identify at a minimum, a promotional offer made to a patron. A promotional coupon may consist of thermal paper, thermal rewritable media or smart cards such as commonly used debit and/or credit cards for financial transactions. Information storage on the media may include magnetic encoding.

"Host System"—A computer, back-end system, gaming machine, or gaming table that sends and/or receives information to and/or from the gaming table device or any component thereof.

"RF ID Chip"—A type of token used at gaming tables in lieu of cash which contain a Radio Frequency circuit that can hold information and does not require a direct electrical connection as an interface connection.

"TITO"—Acronym for Ticket In, Ticket Out, a form of cashless enabled gaming

"SMIB"—Acronym for Slot Machine Interface Board, the board used to manage transactions of a slot machine, such as money in, money out, bills and tickets inserted, jackpots paid, etc.

"PTS"—Acronym for Player Tracking System. The system installed at a gaming establishment that is used to monitor game play activity by participating patrons. A PTS is a rudimentary part of the existing casino industry architecture.

"Cash-Out Vouchering System"—The system installed at a gaming establishment that is used to create cash-out voucher records and issue data packets which are used by a printer in a game to print a cash-out voucher. A Cash-Out Vouchering System is a rudimentary part of an existing casino industry architecture for casinos supporting cashless gaming.

SUMMARY OF THE INVENTION

A gaming table device that allows casinos and other types of gambling establishments to link gaming tables and point of sale terminals in or associated with a casino to connect and use systems is provided. The systems may include a TITO (Ticket In Ticket Out) host system for credit transfer from different types of value bearing items or instruments such as cash, RFID chips, non-RFID chips, gaming vouchers, and promotional coupons to gaming vouchers, promotional coupons, chips, and rewritable cards, among others. Use of the gaming table device expands the use of credit transfer within a gaming establishment and or associated gaming establishments and their slot machines, change machines, and cashier cages to include gaming tables.

In one exemplary embodiment of the invention, a gaming table device may comprise a barcode reader or scanner, a ticket printer, a RFID sensing and/or reading mechanism, a control board, a keypad, a user interface, an external display, and an entry point, among others wherein any or all of these components may be internal or external to said gaming table device.

In another exemplary embodiment of the invention, a gaming table device may be operably connected to a barcode reader or scanner that upon receiving a cash-in or coupon-in signal scans the barcode of a gaming voucher and/or one or a plurality of promotional coupons, the barcode data being transmitted to one or a plurality of host systems for validation and verification.

In another exemplary embodiment of the invention, a gaming table device may be operably connected to a ticket printer that upon receiving a cash-out signal generates a gaming voucher and/or one or a plurality of promotional coupons, the cash-out data being transmitted to one or a plurality of host systems.

In another exemplary embodiment of the invention, a gaming table device may be operably connected to a RFID sensing and/or reading mechanism which would allow an RFID read of the RFID chips when said RFID chips are compiled or placed in a specified region on a gaming table, the RFID read of the chips signaling the gaming table device as to the amount of the cash-out, the amount being recorded in the memory of the gaming table device and posted to the external display of the gaming table device.

In another exemplary embodiment of the invention, a gaming table device may be operably connected to a control board that controls any or all operations of said gaming table device or any or all operations of any component thereof.

In another exemplary embodiment of the invention, a gaming table device may be operably connected to a keypad to receive input such as a cash-in amount, a verification number, or a validation number, among others.

In another exemplary embodiment of the invention, a gaming table device may be operably connected to a user interface such as feedback lights to provide signaling which someone such as an operator or dealer might otherwise miss.

In another exemplary embodiment of the invention, a gaming table device may be operably connected to an external display to provide a user display for data verification and/or validation, among others.

In another exemplary embodiment of the invention, a gaming table device may comprise an entry point or a lit ring into which to push the chips, the entry point or lit ring flashing providing signaling to the dealer, among others.

In another exemplary embodiment of the invention, a gaming table device may be operably connected to any one or combination of the following systems: an accounting system, a TITO system, a Slot Machine Interface Board (SMIB), a Player Tracking System (PTS), a gaming chip issuance/redemption and/or tracking system, a promotional couponing system, a cash-out vouchering system, a point-of-sale system (POS), and other(s), among others.

In another exemplary embodiment of the invention, a gaming table device may be operably connected to a TITO system or any other system in any one or a plurality of mechanism such as a direct connection, indirectly through another connected system, or through a slot machine interface board (SMIB), wherein the connection may use standard or non-standard slot machine protocol.

In another exemplary embodiment of the invention, a gaming table device may be operably connected to a TITO system or any other system via a serial connection, a network connection, a wireless communication or any combination thereof.

In another exemplary embodiment of the invention, a gaming table device processes TITO or gaming vouchers and/or tickets, promotional coupons, thermally rewritable cards, credit cards, and/or debit cards, among others.

In another exemplary embodiment of the invention, a gaming table device may be operably connected to a personal identification number (PIN) device for security of access, said PIN device may be a tethered or mounted, said PIN device may be a PIN keypad, a bio metric security feature, or a combination of both.

In another exemplary embodiment of the invention, a gaming table device may access and rotate TITO or gaming vouchers and/or tickets, promotional coupons, thermally rewritable cards, credit cards, and/or debit cards to provide a low profile and more desirable physical profile of the gaming table device.

In another exemplary embodiment of the invention, in a method of using a gaming table device, the gaming table device may process a total transaction and divide and distribute the total transaction amount into any one or any combination of chips, one or a plurality of TITO or gaming vouchers or tickets, and/or promotional coupons.

In another exemplary embodiment of the invention, in a method of reading and writing magnetic stripe data by a gaming table device accomplished by moving a card over or through a fixed or stationary magnetic reader/writer, the operation may be manual or motorized.

In another exemplary embodiment of the invention, in a method of reading and writing magnetic stripe data by a gaming table device accomplished by moving a magnetic reader/writer over a card which is stationary, the operation may be manual or motorized.

BRIEF DESCRIPTION OF THE DRAWINGS

These and other features, aspects, and advantages of the invention will become better understood with regard to the following description and accompanying drawings where.

DETAILED DESCRIPTION

The inventor's experience with cashless enabled gaming and components thereof has lead to the inventor noting that there are areas for improvement in the design and implementation.

For example, the inventor has determined that there are currently no way to transfer credits or winnings from a gaming table into cashless form such as a gaming voucher for use in other games such as slot machines. Furthermore, there is no way to issue a gaming voucher from gaming table winnings to replace or compliment issuing traditional currency or gaming chips.

Additionally, gaming tables are not operably connected with other systems (such as accounting, POS) in use at a gaming establishment.

Another problem noted by the inventor is that gaming vouchers issued from cashless enabled games cannot be redeemed at a gaming table. Customers with winnings in the form of gaming vouchers must redeem the gaming vouchers for cash in order to use or play those winnings at a gaming table. Gaming establishments run the risk that these customers will leave the gaming establishment instead of continuing to play. This in turn leads to reduced and lost revenue for the gaming establishment.

This invention provides a solution to these problems by enabling cashless gaming in gaming tables, the transfer of credits for the redemption of gaming vouchers issued from cashless enabled games, the issuance of a gaming voucher from winnings at a gaming table, the connection of gaming tables with other systems in use (such as accounting, POS), allowing the use of credit and/or debit cards, and providing a way to divide and distribute a total transaction amount into separate amounts among separate types of value bearing items or instruments such as gaming vouchers, chips, rewritable cards, and/or promotional coupons, among others.

Figure 1:
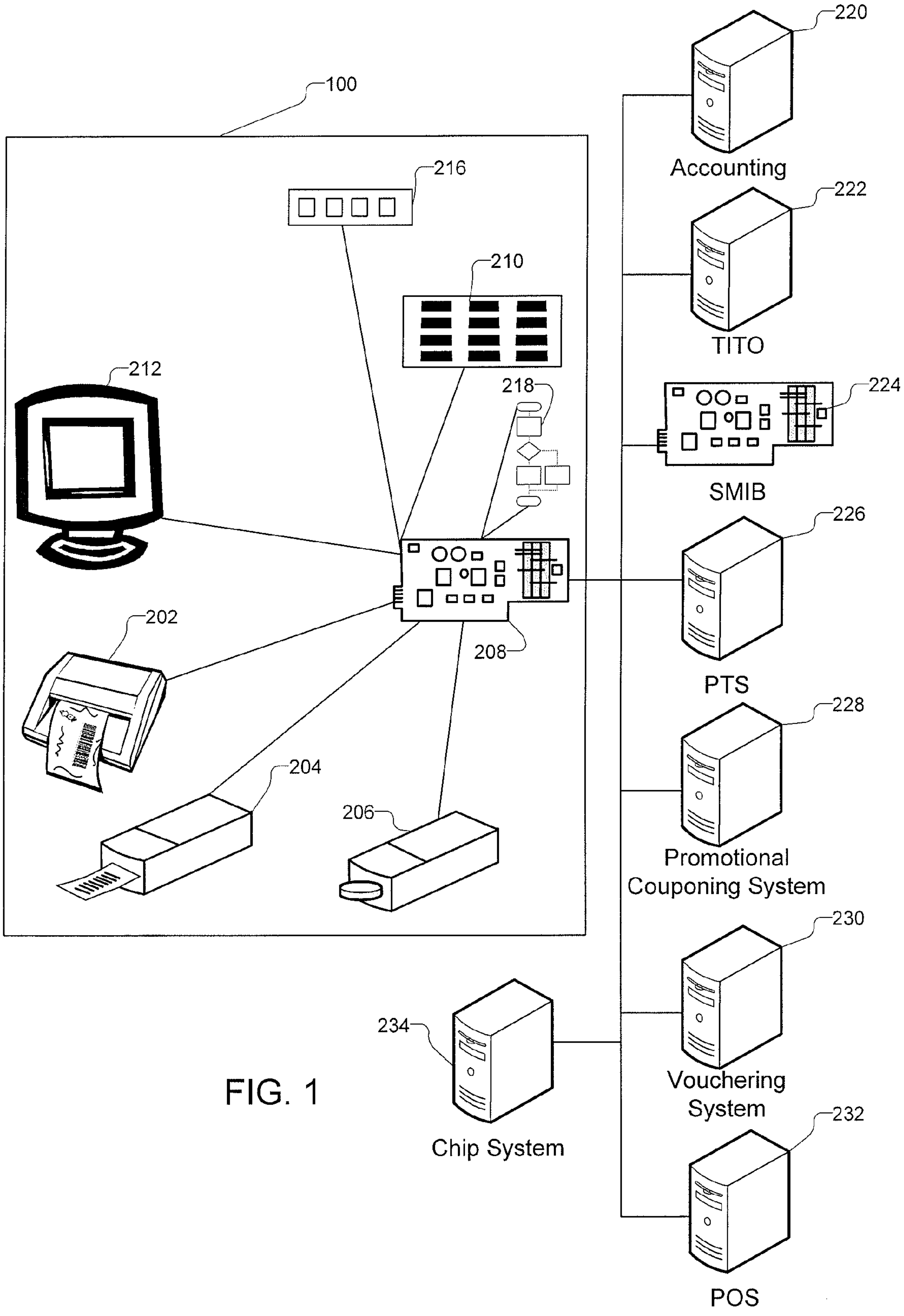
FIG. 1 is a block diagram of a gaming table device and components thereof in accordance with an exemplary embodiment of the invention.

FIG. 1 is a block diagram of a gaming table device and components thereof in accordance with an exemplary embodiment of the invention. As illustrated, a gaming table device 100 includes the following components: a bill validator and voucher reader 202 including a barcode reader, a ticket/voucher/coupon printer 204, a RFID sensing and/or reading mechanism 206, a controller 208, a keypad 210, a player display 212 and a user interface 216. Any or all of these components may be internal or external to the gaming table device.

The gaming table device 100 includes the means to process a plurality of types of value bearing instruments or items such as TITO or gaming vouchers, promotional coupons, thermally rewritable cards, credit cards, and/or debit cards, among others. Additionally, a gaming voucher and/or promotional coupon may consist of thermal paper, thermal rewritable media or smart cards such as commonly used debit and/or credit cards for financial transactions. Information storage on the media may include magnetic encoding of which may be read and/or written as described herein.

The bill validator 202 is used to scan and validate paper currency or scan for the barcode of a gaming voucher or a promotional coupon upon receiving a cash-in or coupon-in signal. The barcode data may be transmitted to a host system for validation and verification.

In one embodiment of a gaming table device, bill validator accepts or rejects game vouchers and/or promotional coupons. The bill validator may scan the barcode and/or other indicia or data of each game voucher and/or promotional coupon inserted into the device for the validation and/or verification of such. The bill validator sends and receives signaling from one or more of host systems to verify and validate the redemption of a game voucher or promotional coupon inserted into a voucher scanning device. Additionally, the signaling may include device status, among others.

The voucher/coupon printer 204 is used to generate tickets, gaming vouchers and/or promotional coupons.

The RFID sensing and/or reading mechanism 206 is used for an RFID read of RFID chips, for instance, when the RFID chips are compiled or placed in a specified region on a gaming table. The RFID read of the chips may signal the gaming table device 100 as to the amount of a either a cash-in or a cash-out. The amount may be recorded in a memory of the controller 208 of the gaming table device and posted to the player display 212 of the gaming table device. Additionally, the RFID sensing and/or reading mechanism may be used to read RFID tags or fibers from a rewritable card or smart card, among others.

The keypad 210 is used to receive input such as a cash-in amount, cash-out amount, a verification number, or a validation number, among others. The keypad allows dealer or player inputs for the secured validation and/or verification of game vouchers and/or promotional coupons inserted into the gaming table device 100 for redemption at a gaming table. The keypad may also serve as a secured mechanism by which game vouchers, game voucher transactions, promotional coupons, promotional coupon transactions, a combination of any, or a combination of all is verified and/or validated at a gaming table. The transactions may include a "comp" given to a player or any win from a gaming table. Additionally, the keypad is used to request a cashout from a gaming table and/or provide the manual interface by which a player may play at a gaming table.

The user interface 216 is used to provide signaling which someone such as an operator or dealer might otherwise miss. An example user interface is an interface having feedback lights. Another example is an entry point or lit ring used to provide signaling to the dealer or player by flashing when chips are pushed into the gaming table device.

The player display 212 is used to provide a visual display for data verification and/or validation, among other uses.

An entry point or lit ring may be used to provide signaling to the dealer or others, for instance, flashing when chips are pushed in.

In the operation of one embodiment of the invention, a gaming table device may be coupled to a gaming table for the transfer of credits in the form of gaming vouchers, to generate gaming vouchers and or promotional coupons other items of interest to patrons of a gaming establishment and or associated gaming establishments.

The gaming table device also may be used to read RFID chips to process a cash-out signal to generate a gaming voucher comprising a value equal to or less than the total amount of RFID chips or winnings from a gaming table.

In the operation of another embodiment of the invention, a gaming table device is coupled to a point-of-sale system to generate promotional coupons and other items of interest to patrons of a gaming establishment and or associated gaming establishments.

The controller 208 controls any or all operations of the gaming table device or any or all of the operations of any component thereof. In addition, a controller may exist for each component. The controller includes programming instructions 218 stored in a memory (not shown) of the controller for instructing the operations of the controller.

The foregoing description of the controller 208 of gaming table device 100 is provided by way of example and not of limitation, it being understood that controller 208 could be implemented in a variety of ways without deviating from the spirit of the invention. For example, the controller 208 could be constructed from hardware such as hardwired circuits in a single device or in multiple devices such as integrated circuits mounted on a printed circuit board. Alternatively, controller 208 could also be constructed from a combination of hardware and software components stored in a memory and that are executed by a processor.

The controller 208 may also include one or more interfaces (not shown) for communication with one or more host systems. The communications may include signaling such as a security code or authentication code for the verification and/or validation of the issuance and redemption of game vouchers or promotional coupons inserted into a bill validator or voucher scanning device at a gaming table.

As illustrated, a gaming table device may be operably connected to one or more of the following system hosts or devices for data processing, data verification, and or data validation, among other operations: an accounting system 220, a TITO system 222, a Slot Machine Interface Board (SMIB) 224, a Player Tracking System (PTS) 226, a gaming chip issuance/redemption and/or tracking system 234, a promotional couponing system 228, a vouchering system 230, and a point-of-sale system (POS) 232, among other kinds of system hosts.

The accounting system 220 is used to process data related to any financial transaction that occurs within a gaming establishment and or associated gaming establishments.

The TITO system 222 is used to control the issuance and redemption of gaming vouchers for the cashless enabled games within a gaming establishment and or associated gaming establishments.

The Slot Machine Interface Board (SMIB) 224 is used to process data related to issuance and redemption of gaming vouchers and or promotional coupons.

The Player Tracking System (PTS) 226 is used to monitor game play activity by participating patrons. Additionally, data from the PTS is used by a gaming table device to personalize a promotional coupon.

A gaming chip issuance/redemption and/or tracking system 234 is used to monitor play activity at a gaming table. Additionally, gaming chips containing RFID may be electronically tracked by the system and read by the gaming table device.

A promotional couponing system 228 is used to create and manage promotional coupons in the gaming environment. The promotional couponing system is used to control and perform the printing of promotional coupons and other items of interest to patrons of a gaming establishment and or associated gaming establishments.

The vouchering system 230 is used to create cash-in and cash-out voucher records that are used by the gaming table device 100 and other gaming machines.

The point-of-sale (POS) system 232 may be installed in a gaming establishment in various locations where business is transacted, such as a retail shop, restaurant, ticket sales counter, front desk, etc. The POS is used to monitor and control transaction activity, typically through a cash register and other peripherals.

Other systems (not shown) may include a lodging management system that monitors and tracks a patron's lodging within a gaming establishment and or associated gaming establishment as well as one or a plurality of links to financial institutions for verification and processing of credit cards and/or debit cards, among others.

The gaming table device 100 may be operably connected to any system such as by a direct connection, indirectly connected through another connected system, or connected through a slot machine interface board (SMIB). The connection to a system may use a standard game protocol. In a variation, the connection may use a nonstandard game protocol. In addition, a gaming table device may be connected to any system using a plurality of connections such as a serial connection, a network connection, or a wireless connection.

In another embodiment of the invention, the voucher/coupon printer, bill validator, interface such as a display, and keypad are operably connected to a controller or other interface, with the controller or other interface connected to one or more of the host systems.

In another embodiment of the invention, each component may be operably connected to a separate controller or other interface where each controller or other interface may be internal or external to each device. The plurality of controllers or other interfaces may be operably connected to one or more of the host systems.

One or more of host systems may communication with one or more of the other host systems for the validation and/or verification of the issuance and/or redemption of one or more of game vouchers and/or promotional coupons. Additionally, one or more of host systems may transmit data related to game vouchers, game voucher transactions, promotional coupons, promotional coupon transactions, etc. to the other hosts or the gamine table device.

Figure 2:
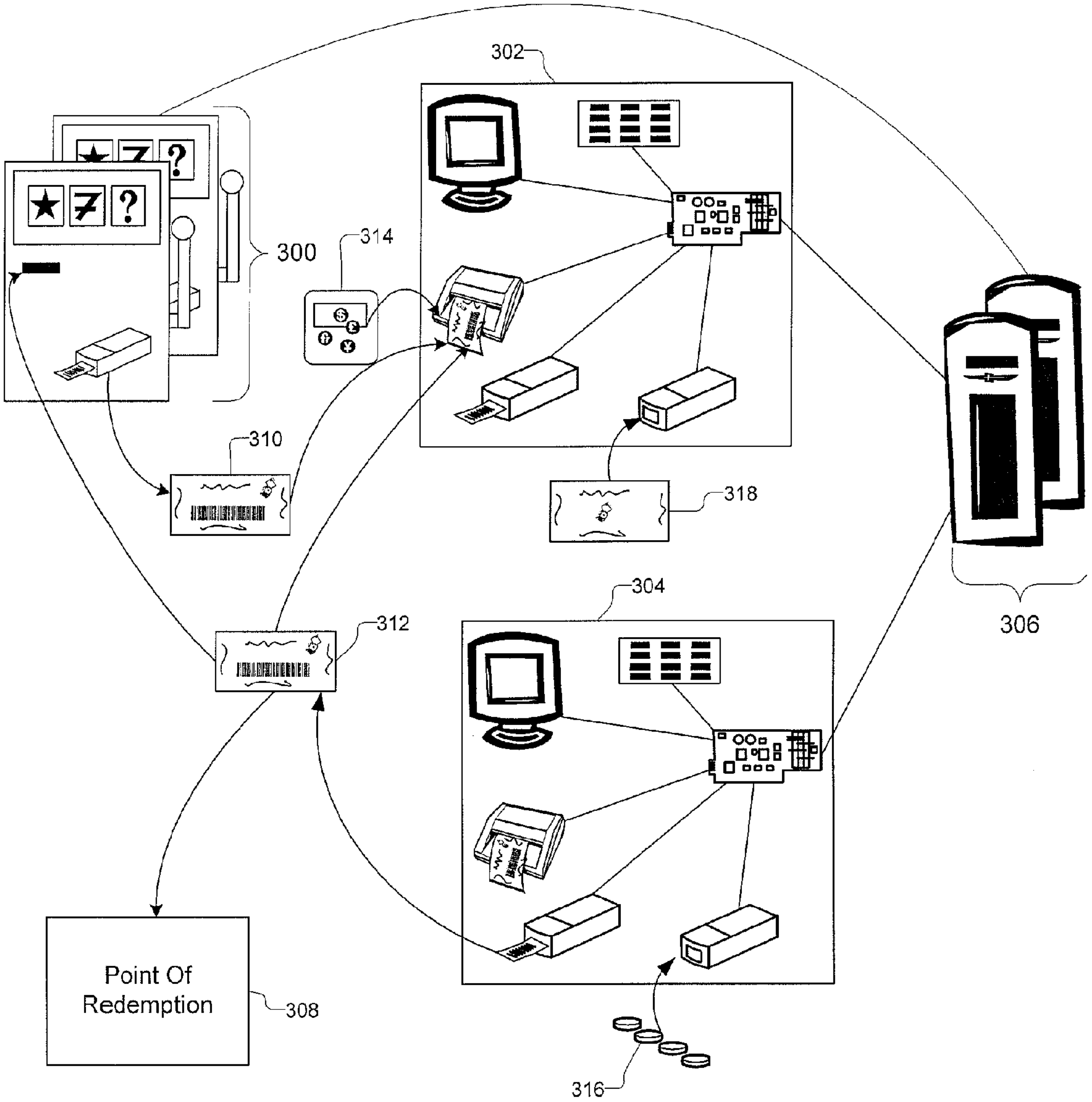
FIG. 2 is an illustration of the components of a gaming table device in a gaming system in accordance with an exemplary embodiment of the present invention.

FIG. 2 is an illustration of the use of vouchers, RFID chips, RFID cards and promotional coupons issued and redeemed in a gaming vouchering system in accordance with an exemplary embodiment of the present invention. A gaming vouchering system includes one or more gaming machines 300, such as a slot machine having a bill acceptor/validator and gaming table device, among other components not shown. The gaming system includes one or more gaming table devices, such as gaming table devices 302 and 304. The gaming machines and gaming table devices are operably connected to one or more of host systems 306. In operation, the gaming machines and the gaming table devices generate and use vouchers and coupons, such as vouchers 310 and 312.

The gaming system may also include a point of redemption 308 such as a kiosk, point-of-sale, cashier's cage, or other location where a player can redeem a game voucher or promotional coupon.

A player may cash-in at a gaming table using a gaming table device. The gaming table devices accept currency 314, RFID chips 316, RFID cards 318 and the gaming vouchers. The gaming vouchers may come from another gaming table device or from one of the gaming machines. When a player cashes-out, the gaming table devices are used to generate a voucher or coupon that may then be read by one of the gaming machines for a cash-in or redeemed at a point of redemption.

Figure 3:
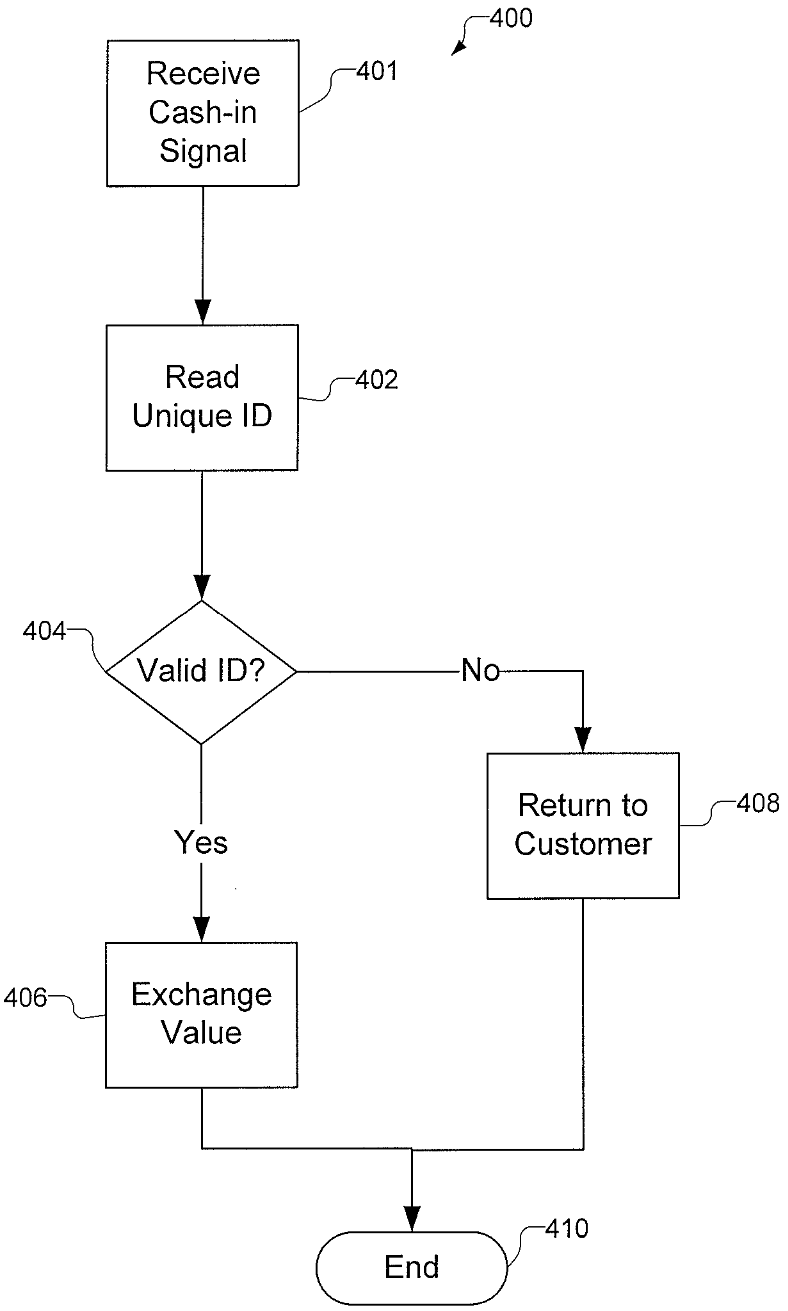
FIG. 3 is a flow chart diagram of a cash-in process in accordance with an exemplary embodiment of the invention.

In the operation of a cash-in embodiment, when a customer presents a gaming voucher or promotional coupon to the entry point of the gaming table device, a cash-in signal such as the one later described in FIG. 3 is processed. Using the barcode reader/scanner, the gaming table device reads the unique ID or serial number from the gaming voucher. The unique ID is transmitted to a host system such as the TITO host system for validation. The host will validate the unique ID and signal the gaming table device as to the value of the gaming voucher or promotional coupon for exchange of chips at the table or for good and or services at any other associated point of sale.

Additionally, the value of the gaming voucher or promotional coupon also may be indicated on the external display or user interface.

In the operation of another embodiment of the invention, the actual value or a determined value of the gaming voucher or promotional coupon may be indicated by the entry point, user interface, or external display. For example, a gaming establishment may determine that any gaming voucher or promotional coupon with a value of $200 may be eligible for a certain promotion. When a customer having a gaming voucher meeting this requirement inserts said gaming voucher into the entry point of a gaming table device, the entry point, user interface, or external display may provide flashing lights or some other visual indicator for eligibility for the promotion.

Figure 4:
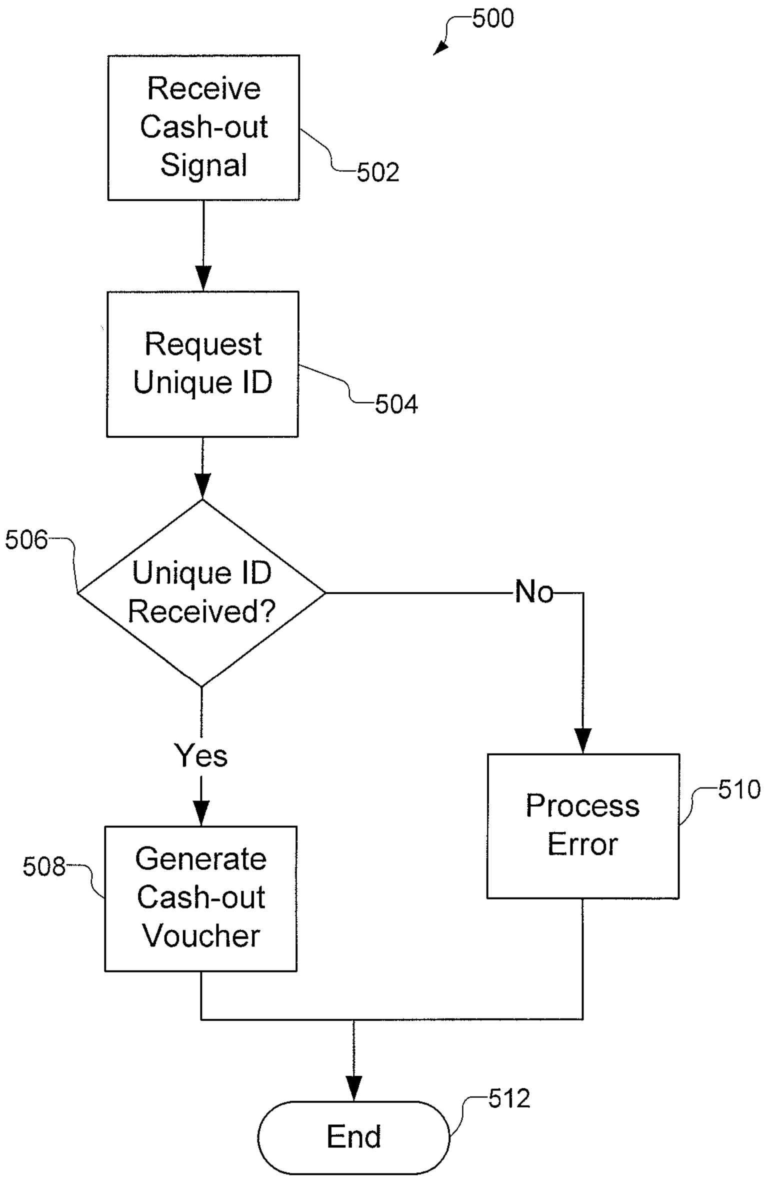
FIG. 4 is a flow chart diagram of a cash-out process in accordance with an exemplary embodiment of the invention.

In the operation of a cash-out embodiment similar to when a customer presses the cashout button on a slot machine or other gaming machine, at the end of a game when chips are cashed in or at the end of a transaction for goods and or services that require change to be paid to the customer, a cash-out signal such as the one later described in FIG. 4 is processed. A unique ID and possibly additional data then may be transmitted to the requesting gaming table device where the requesting gaming table device may generate a gaming voucher or promotional coupon using the unique ID.

Additionally, a user such as a gaming table dealer may enter an amount to be returned to the customer using a keypad. Using a user interface or external display, a user may also visual verify the entered amount. In this embodiment, if the value exceeds the approved limit for a dealer, a gaming table supervisor may use the keypad to authorize the transaction. Once the value is entered, the gaming table device may request a unique ID from one or a plurality of host systems for the value of the transaction FIG. 3 is a flow chart diagram of a cash-in process 400 in accordance with an exemplary embodiment of the invention. As illustrated, the process 400 begins with receiving (401) a cash-in signal where a gaming voucher or promotional coupon is inserted into the entry point of the gaming table device. Using the barcode reader/scanner, the gaming table device reads (402) the unique ID or serial number from the gaming voucher. The unique ID is transmitted to a host system such as the TITO host system for validation. If the unique ID is valid (404), the host will signal the gaming table device the value of the gaming voucher or promotional coupon for exchange (406) of chips at the table or for good and or services at any other associated point of sale.

If the unique ID is invalid, the gaming voucher or promotional coupon may be returned (408) to the customer. The process then ends (410).

In one variation, should the unique ID be identified as invalid or already used, the gaming voucher or promotional coupon may not be returned to the customer. Instead, an alert signal may be sent to one or a plurality of personnel at the gaming table or elsewhere in a gaming establishment. Additionally, one or a plurality of host systems such as an accounting system may flag that unique ID in the database to identify that unique ID as potentially being used for counterfeiting.

Additionally, the value of the gaming voucher or promotional coupon may also be indicated on the display.

FIG. 4 is a flow chart diagram of a cash-out process 500 in accordance with an exemplary embodiment of the invention. As illustrated, the process 500 begins with receiving (502) a cash-out signal which would occur at the end of a game when chips are cashed in or at the end of a transaction for goods and or services that require change to be paid to the customer. The gaming table device may then request (504) a unique ID from one or a plurality of host systems. The unique ID may be a serial number or transaction number. The unique ID and possibly additional data then may be transmitted to the requesting gaming table device. If the requesting gaming table device receives the unique ID (506), the process continues with generating (508) a cash-out voucher where the requesting gaming table device may generate a gaming voucher or promotional coupon using the unique ID.

If the requesting gaming table device does not receive the unique ID, the process continues with a process error (510) where, for instance, the gaming table device may report and display an error. The process 500 then ends (512).

Additionally, a user may enter an amount to be returned to the customer using a keypad.

Figure 5A:
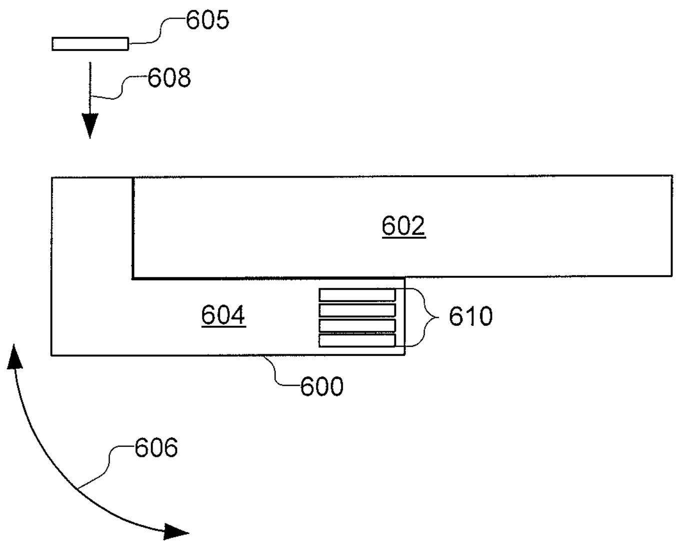
FIG. 5*a* is a side view illustration of a gaming table device in accordance with an exemplary embodiment of the invention.

FIG. 5*a* is a side view illustration of a gaming table device 600 in accordance with an exemplary embodiment of the invention. The gaming table device may include any or all components as previously described. As illustrated, the gaming table device is connected to a gaming table 602 where the main body 604 of the gaming table device may be concealed on the side or underneath the gaming table. Additionally, the gaming table device may be positioned partially or completely below the gaming table with the entry/exit point for issuing and/or receiving media, 605, such as gaming vouchers, promotional coupons, and/or other media positioned through an aperture (not shown) on the gaming table.

The gaming table device may be removably and mechanically mounted to allow access to the device such as swinging down for servicing (as indicated by the arrows 606). Additionally, the gaming table device may be removably, mechanically, and slidably mounted to allow access to the device where the device may slide out for servicing and slide in for use.

In the operation of one embodiment, media 605, such as a gaming voucher, promotional coupon, or other media, such as a rewritable card, is inserted (as indicated by arrow 608) or placed horizontally on the gaming table device, thereby signaling a cash-in signal. The gaming table device, after accepting the gaming voucher, promotional coupon or other media, such as rewritable cards, then may move the gaming voucher, promotional coupon, or other media to a storage area 610 of the gaming table device where it is stored in a horizontal fashion.

In the operation of another embodiment of the invention, a cash-in signal may be received by the gaming table device. Once the signal is processed and the total transaction amount is determined, the gaming table device may divide and distribute the amount into one or a plurality of media, such as a percentage of the total transaction amount being issued as chips, a gaming voucher, a promotional coupon, and/or cash. Additional details on this process are later described in FIG. 9.

In the operation of another embodiment of the invention, a cash-out signal may be received by the gaming table device after which the gaming table device may generate and issue a gaming voucher and/or promotional coupon.

In the operation of another embodiment of the invention, a cash-out signal may be received by the gaming table device after which the gaming table device may locate and pull media, such as a rewritable card, from a storage area of the gaming table device. The gaming table device then may issue the media such as a rewritable card.

Additionally, the gaming table device may pull media from a media supply area (not shown) to issue a gaming voucher, promotional coupon, or other media.

Additionally, the rewritable card or other media may be thermally printed and/or magnetically encoded with additional data and information, and/or thermally and/or magnetically erased at any time the media is within the printing/encoding module of the gaming table device.

Figure 5B:
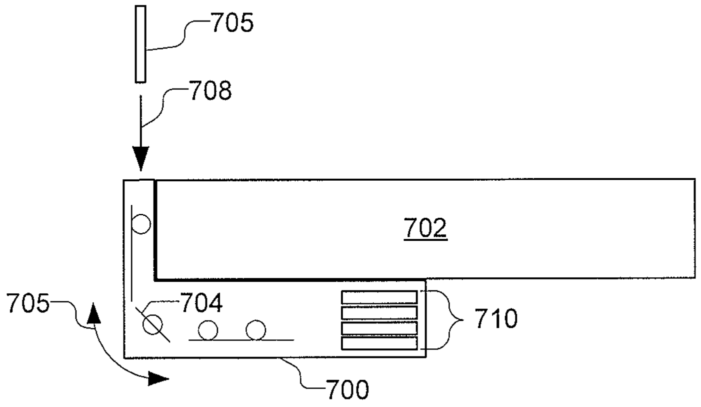
FIG. 5*b* is a side view illustration of a gaming table device with a mechanism to rotate media in accordance with an exemplary embodiment of the invention.

FIG. 5*b* is a side view illustration of a gaming table device 700 with a mechanism to rotate media in accordance with an exemplary embodiment of the invention.

The gaming table device 700 may include any or all components and operations as previously described. In this embodiment, the gaming table device 700 connected to a gaming table 702 includes a media transport 704 having a rotating platen or similar mechanism to rotate (as illustrated by arrow 705) media, such as a rewritable card, thereby providing a low profile and more desirable physical profile of the gaming table device. For example, media may be rotated 90 degrees.

In the operation of one embodiment, the media 705, such as a gaming voucher, promotional coupon, other media, such as rewritable cards is inserted or placed vertically (as indicated by arrow 708) in the gaming table device, thereby signaling a cash-in signal. The gaming table device and media transport thereof, after accepting the gaming voucher, promotional coupon, or other media such as a rewritable card then rotates the gaming voucher, promotional coupon, or other media. This rotation may occur at a point within the gaming table device prior to the gaming voucher, promotional coupon, or other media being placed in a storage area 710 of the gaming table device.

Additionally, when a cash-out signal is received by the gaming table device, the gaming table device may locate and pull media, such as a rewritable card, from a storage area (not shown) of the gaming table device. The gaming table device then may rotate (705) the gaming voucher, promotional coupon, or other media, such as a rewritable card to fit through the low profile area after which the device may issue the media.

In one variation, the gaming table device when accepting a gaming voucher and/or promotional coupon of one media type such as paper may guide this media type to the storage area instead of rotating said media type.

Additionally, the gaming table device may pull media from a media supply area (not shown) to issue a gaming voucher, promotional coupon, or other media.

Figure 6:
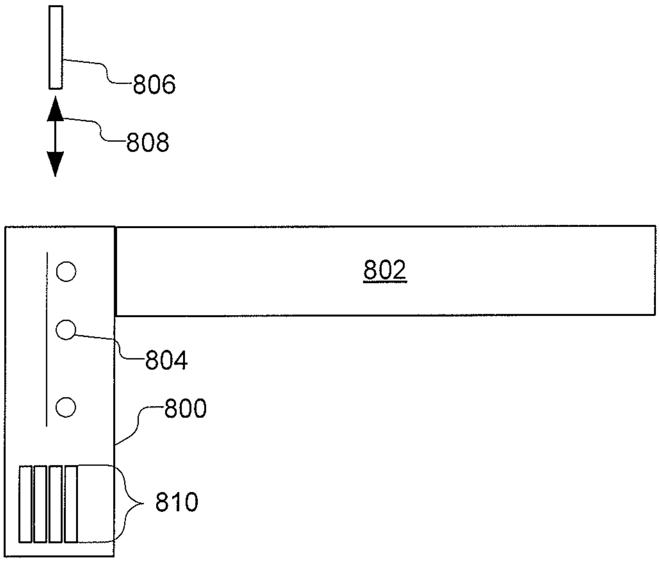
FIG. 6 is a side view illustration of a gaming table device with a mechanism to process vertical media in accordance with an exemplary embodiment of the invention.

FIG. 6 is a side view illustration of a gaming table device 800 connected to a gaming table 802 and including a media transport 804 to process vertical media in accordance with an exemplary embodiment of the invention.

The gaming table device 800 may include any or all components and operations as previously described. In this embodiment, the gaming table device is connected to a gaming table 802 in a fashion which permits media 806, such as gaming vouchers, promotional coupons, and other media, such as rewritable cards, to be inserted and issued (as indicated by arrow 808) vertically as well as stored vertically in a storage area 810 of the gaming table device.

Figure 7:
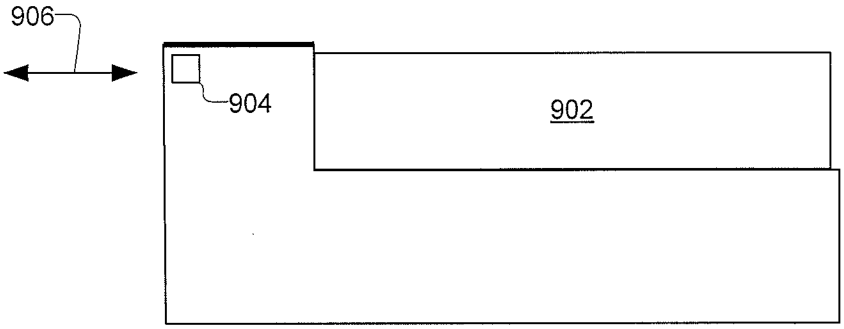
FIG. 7 is a side view illustration of a gaming table device having magnetic stripe reading/writing mechanism in accordance with an exemplary embodiment of the invention.

FIG. 7 is a side view illustration of a gaming table device 900 connected to a gaming table 902 and including a magnetic stripe reading/writing mechanism 904 in accordance with an exemplary embodiment of the invention.

The gaming table device 900 may include any or all components and operations as previously described as well as the magnetic reader/writer device 904. The magnetic reader/writer device may be used to read a magnetic stripe and write data (as indicated by arrow 906) to the magnetic stripe of media such as a rewritable card, credit card, debit card, and/or smart card, among others.

In this embodiment, reading and/or writing by the magnetic reader/writer device may be accomplished by moving the magnetic reader/writer over a card which is stationary, In the operation of one embodiment, the movement of the magnetic reader/writer may be manual. In another, the movement is motorized. Additionally, the magnetic reader/writer may be positioned above or below a card.

Figure 8:
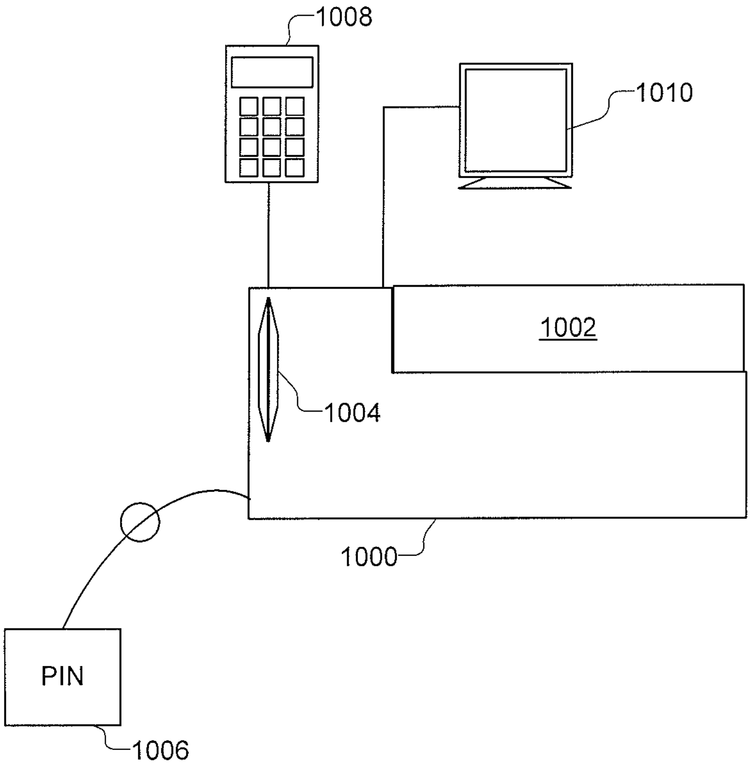
FIG. 8 is a side view illustration of a gaming table device having magnetic stripe reading/writing mechanism and being operably connected to a PIN device, keypad, and display in accordance with an exemplary embodiment of the invention.

FIG. 8 is a side view illustration of a gaming table device 1000 connected to a gaming table 1002 and having magnetic stripe reading/writing mechanism 1004 operably connected to a PIN input device 1006, keypad, and display 1010 in accordance with an exemplary embodiment of the invention.

The gaming table device 1000 may include any or all components and operations as previously described. For example, the gaming table device may be operably connected to a keypad and display and/or user interface such as previously described in FIG. 1 and the gaming table device may be operably connected to a magnetic reader/writer such as previously described in FIG. 7.

The gaming table device 1000 is operably connected to a Personal Identification Number (PIN) device for security of access. The PIN device may be a keypad that is mounted or on a tether of the type normally used for debit and credit card transactions. The PIN device also may include a bio metric security feature to control the operation of or access to the gaming table device.

In this embodiment of the invention, reading and writing magnetic stripe data by a gaming table device may be accomplished by moving or swiping a card through or over a fixed or stationary magnetic reader/writer 1004, the operation may be manual or motorized.

Figure 9:
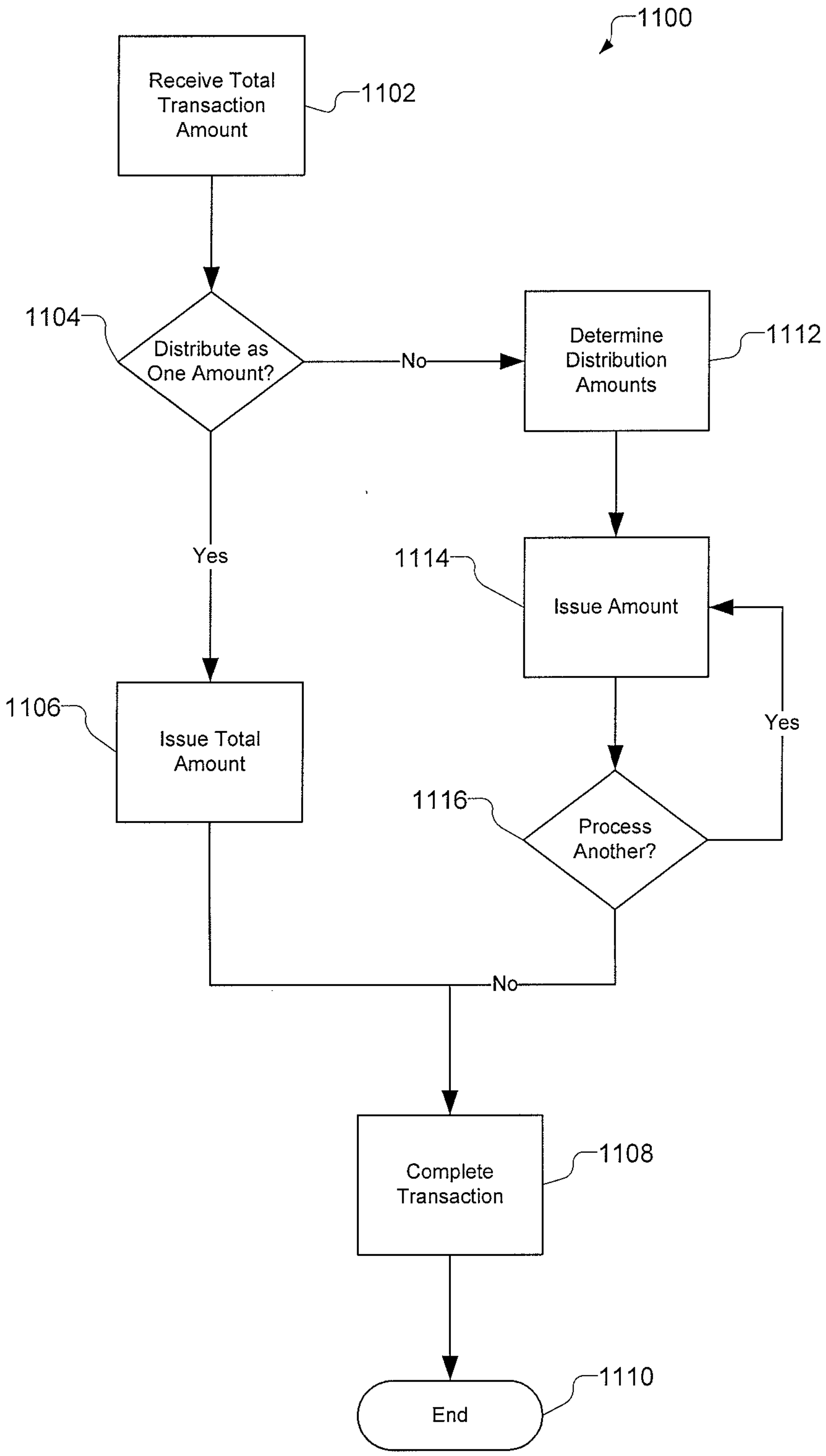
FIG. 9 is a flow chart diagram of a total transaction amount division process in accordance with an exemplary embodiment of the invention.

FIG. 9 is a flow chart diagram of a total transaction amount division process 1100 in accordance with an exemplary embodiment of the invention. As a gaming table device in accordance with the invention includes a plurality of ways of issuing different types of value bearing items or instruments, the process 1100 may be used to divide and distribute a total transaction amount into any one or any combination of chips, one or a plurality of TITO or gaming vouchers or tickets, and/or promotional coupons. For example, a total transaction amount of $1,000 may be divided and distributed as $500 in chips and $500 in one or a plurality of gaming vouchers. Some human involvement may be involved, such as a table dealer physically entering the amount of each distribution as well as a customer or patron authorizing the transaction and/or amount distribution.

As illustrated, the process begins with receiving (1102) a total transaction amount, where after, for example, a credit card is charged, the total transaction amount is made available. If it is determined (1104) that the amount is to be distributed as one amount, the process continues with issuing (1106) a total amount where, for example, the amount may be issued on a gaming voucher and the transaction is completed (1108) and the process ends (1110).

If the amount is to be distributed as multiple amounts, such as with chips and a gaming voucher, the process continues with determining (1112) distribution amounts. For example, a $3,000 total transaction amount may be distributed as chips worth $1,500, a plurality of gaming vouchers worth $1,250, and the purchase of a plurality of show tickets worth $250 based on a promotional coupon the customer or patron received.

After determining the distribution amounts, the process continues with issuing (1114) and amount. Continuing with our previous example, the gaming table device may first issue the $1,500 of chips. Since there are additional distribution amounts to process, the process loops (1116) back to issue amount where the gaming table device may issue $1,250 in a plurality of gaming vouchers; then $250 in promotional coupons as show tickets. Once all amounts have been distributed, the transaction is complete.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method of operating a gaming table device of a gaming table, comprising:
- receiving a total transaction amount for a player playing at the gaming table;
- determining whether the total transaction amount is to be issued as a single amount or as a distributed amount;
- issuing, when it is determined that the total transaction amount is a single amount, a single type of value bearing item for the total amount; and
- determining, when it is determined that the total transaction amount is to be distributed among a plurality of value bearing items, a plurality of distribution amounts of the total transaction amount for distributing the total transaction amount across a plurality of types of value bearing items, and issuing a value bearing item from the plurality of types of value bearing items for each distribution amount of the plurality of distribution amounts.

2. The method of operating a gaming table device of claim 1, wherein the plurality of types of value bearing items comprise cash, Ticket In Ticket Out (TITO) vouchers, gaming chips, promotional coupons and rewritable cards.

3. The method of claim 1, wherein the single type of value bearing item is a Ticket In Ticket Out (TITO) voucher.

4. The method of claim 1, wherein the single type of value bearing item is a gaming chip.

5. The method of claim 1, wherein the single type of value bearing item is a rewritable card.

6. The method of claim 1, wherein the total transaction amount is for a cash-in amount for the gaming table.

7. The method of claim 1, wherein the total transaction amount is for a cash-out amount for the gaming table.

8. The method of claim 1, wherein the single type of value bearing item is a Ticket In Ticket Out (TITO) voucher.

9. A gaming table device of a gaming table, comprising:
- means for receiving a total transaction amount for a player playing at the gaming table;
- means for determining whether the total transaction amount is to be issued as a single amount or as a distributed amount;
- means for issuing, when it is determined that the total transaction amount is a single amount, a single type of value bearing item; and
- means for determining, when it is determined that the total transaction amount is to be distributed among a plurality of value bearing items, a plurality of distribution amounts of the total transaction amount for distributing the total transaction amount across a plurality of types of value bearing items, and issuing a value bearing item from the plurality of types of value bearing items for each distribution amount of the plurality of distribution amounts.

10. The gaming table device of claim 9, wherein the plurality of types of value bearing items comprise cash, Ticket In Ticket Out (TITO) vouchers, gaming chips, promotional coupons and rewritable cards.

11. The gaming table device of claim 9, wherein the single type of value bearing item is cash.

12. The gaming table device of claim 9, wherein the single type of value bearing item is a gaming chip.

13. The gaming table device of claim 9, wherein the single type of value bearing item is cash.

14. The gaming table device of claim 9, wherein the single type of value bearing item is a rewritable card.

15. The gaming table device of claim 9, wherein the total transaction amount is for a cash-in amount for the gaming table.

* * * * *